United States Patent [19]

Clower

[11] Patent Number: 5,296,796
[45] Date of Patent: Mar. 22, 1994

[54] METHOD AND APPARATUS FOR DYNAMIC RANGE OPTIMIZATION IN A PWM MOTOR DRIVE

[75] Inventor: Penn H. Clower, Andover, Mass.

[73] Assignee: The Charles StarkDraper Laboratory, Inc., Cambridge, Mass.

[21] Appl. No.: 980,535

[22] Filed: Nov. 23, 1992

[51] Int. Cl.⁵ .............................................. H02P 5/28
[52] U.S. Cl. .................................... 318/808; 318/254; 318/805
[58] Field of Search ............... 318/807, 808, 809, 805, 318/799, 798, 254, 800

[56] References Cited

U.S. PATENT DOCUMENTS

| | | | |
|---|---|---|---|
| 4,266,176 | 5/1981 | Fulton | 318/801 |
| 4,267,499 | 5/1981 | Kurosawa | 318/800 |
| 4,306,182 | 12/1981 | Curtiss | 318/811 |
| 4,348,627 | 9/1982 | Fulton | 318/807 |
| 4,356,440 | 10/1982 | Curtiss et al. | 323/210 |
| 4,413,223 | 11/1983 | Yundt et al. | 322/32 |
| 4,417,194 | 11/1983 | Curtiss et al. | 322/47 |
| 4,445,080 | 4/1984 | Curtiss | 318/798 |
| 4,467,262 | 8/1984 | Curtiss | 318/811 |
| 4,818,890 | 4/1989 | Mose et al. | 318/808 |
| 4,950,968 | 8/1990 | Ogura | 318/254 |

Primary Examiner—William M. Shoop, Jr.
Assistant Examiner—John W. Cabeca
Attorney, Agent, or Firm—Lappin & Kusmer

[57] ABSTRACT

A system for increasing the power delivered to a brushless dc or induction motor from a sinusoidal motor drive by maximizing the dynamic range available to the motor winding excitation signals. According to one embodiment of the invention, sinusoidal excitation currents are applied to all but one of the primary windings of a brushless dc or induction motor. A variable voltage drive is applied to the one remaining winding. The voltage drive maximizes the dynamic range available to the sinusoidal excitation currents by selecting the voltage applied to that one remaining winding to be the difference between one half the dc source voltage and the instantaneous average of the highest and lowest of the motor terminal voltages.

14 Claims, 7 Drawing Sheets

METHOD AND APPARATUS FOR DYNAMIC RANGE OPTIMIZATION IN A PWM MOTOR DRIVE

REFERENCE TO RELATED PATENTS

The subject matter of this application is related to that disclosed in U.S. Pat. No. 4,306,182 entitled "Polyphase Motor Drive System With Balanced Modulation," and U.S. Pat. No. 4,467,262 also entitled "Polyphase Motor Drive System With Balanced Modulation," assigned to the assignee of the present application. Those patents are incorporated herein by reference.

BACKGROUND OF THE INVENTION

This invention relates to a control system for polyphase electrical motors. More particularly, it relates to an electronic system for providing sinusoidal excitation signals to ac and brushless dc motors.

Traditionally, dc electric motors utilized a brush and commutator design including a rotor located within a stator. In a dc motor, a rotating field-flux is established in the air gap between the rotor and stator by the stator, either through permanent magnets or by a field winding distributed about the stator. Generally, the rotor has a plurality of windings, distributed about its axis, which accomodate the current required to achieve the desired electrical power level. The rotor is in turn coupled to the motor shaft. The brush and commutator mechanism switches excitation currents from a dc power source to the rotor windings. The rotor revolves as a result of the interaction between the field-flux created in the air gap and the current flowing in the rotor windings.

It is well known in the art that the torque contribution by any one rotor winding varies sinusoidally with the rotor position. To establish continuous torque, the brush-type motors typically employ many separate rotor windings. As a result, by the time that the torque contribution due to one rotor winding is detectably waning due to a change in the rotor position, the brush and commutator mechanism is already switching the excitation current to the next rotor winding. Consequently, brush-type motors provide a relatively constant shaft torque.

Nevertheless, brush-type motors suffer from several reliability problems. One problem is that the brushes, typically made of carbon, wear away, creating a conductive carbon powder which must be cleaned out periodically. Another problem is that sparking, at the commutator, makes it difficult to use the motor in many environments. A third problem is that periodic replacement of the brushes and re-machining of the commutator segments is necessary.

An alternate to a dc motor is an induction motor. Such motors include power handling or primary windings on the stator, with secondary windings arranged in a shorted turn configuration about the rotor. Through the use of the shorted turn configuration, induction motors avoid the need for mechanical brushes and commutators. As a result, induction motors are generally considered more reliable and less expensive to maintain then their brushed predecessors. Consequently, they are popular as replacements for the older brush-type designs. However, induction motors are considered somewhat more difficult to control, particularly in variable speed applications and in servo systems which require many velocity changes and torque reversals. Such is a result of the nonlinear relationship between torque and applied current in an induction motor.

In the last ten or fifteen years, a new class of motor, the brushless dc or synchronous motor, has been developed. It combines the control ease of the brush-type motor with the reliability of the induction motor. Field flux is typically established by a permanent magnet assembly contained in the rotor. An excitation current is periodically switched between a plurality of phase windings distributed about the stator. Torque is generated, and the motor shaft rotates, as a result of the interaction between the field-flux in the air gap and the phase winding currents.

Instead of switching phase winding currents with a brush and commutator mechanism, synchronous motors generally utilize external electronic switches. A typical controller senses shaft position (e.g., using a resolver or magnetic reed switches), and then uses the position information to control switching (typically with transistors) of excitation currents to particular phase windings at the appropriate times.

Unlike the brush-type dc motors, the newer motors usually have only three phase windings, requiring six commutation changes per cycle. Early brushless motor controllers, called "six-step" controllers, utilized whatever drive voltage was available and abruptly switched it between the phase windings in a periodic six-step sequence. Such an approach tended to produce substantial torque ripple and mechanical noise.

One solution to the torque ripple problem has been to employ what are known as sinewave controllers. In a sinewave controller, the rotor windings are driven with a voltage (or current) excitation which smoothly transits from winding to winding instead of being abruptly switched. This is accomplished in some prior art three phase systems by using a plurality of high frequency, two-state modulators driving electronic switches to synthesize two drive current phases from a dc power source. One phase current is coupled into a first stator winding while the other is coupled into a second stator winding. The current in the third stator winding is necessarily set by Kirchoff's Current Law, as the negative of the sum of the currents in the first and second windings. Therefore, the third winding is typically driven with a voltage drive. One such system is disclosed in U.S. Pat. Nos. 4,306,182 and 4,467,262. According to those patents, the voltage, coupled to the third winding is controlled as a function of the current error signals from the other two terminals.

While sinewave drive controllers such as disclosed in U.S. Pat. Nos. 4,306,182 and 4,467,262, provide a quiet motor drive system with low torque ripple, they generate less power and must operate at lower speed than do their square wave counterparts. The reason is that a square wave of a particular frequency contains more energy than does a sinewave of the same peak amplitude and same fundamental frequency.

Accordingly, one object of the present invention is to provide a system which minimizes the effect of the power loss suffered as a result of utilizing a sinewave type motor controller.

A second object of the invention is to maximize the power transferred to a particular motor from a particular dc voltage source by enhancing the dynamic range available to the motor terminal voltages and thus, the excitation signals applied to the motor's primary windings.

Another object of the invention is to provide a system for modulating a voltage source to set the voltage at the wye-center node in a way which maximizes the dynamic range available to the motor terminal voltages.

Other general and specific objects of the invention will in part be obvious and will in part appear hereinafter.

SUMMARY OF THE INVENTION

The invention relates generally to sinewave drives for electric motors. In particular, it relates to a method and apparatus for increasing the power and voltage delivered by a sinewave motor drive by maximizing the dynamic range available to the back EMF signals and thus, the motor winding excitation signals. The invention also relates to obtaining the maximum possible operating speed for a given motor and voltage source.

According to one embodiment, the invention provides an apparatus for generating a control signal for application to one of a plural number (n) of phase windings of an n-phase electrical motor. According to this embodiment, the other (n−1) of the phase windings are driven from current sources, and the motor is powered from a dc voltage source. The dc voltage source has a high side terminal and a reference side terminal, and a potential difference, measured between those terminals.

The apparatus includes a signal generation element, an averaging element, a potential difference generation element, and a summation element. The signal generation element generates phase voltage signals indicative of voltage levels at each of the phase windings. The averaging element couples to the signal generation element, and determines an arithmetic mean between a greatest one of the phase voltage signals and a least one of the phase voltage signals. The averaging element also generates an averaging signal, indicative of the determined arithmetic mean. The potential difference generation element generates a potential difference signal indicative of the potential difference between the dc voltage source terminals. The summation element couples to the averaging element and to the potential difference element, and subtracts the averaging signal from a predetermined portion of the potential difference signal. The summation element also generates a control signal indicative of that subtraction.

According to another embodiment, the invention provides an apparatus for controlling the speed of an n-phase electrical motor having a plural number (n) of phase windings.

The apparatus includes current drive elements, signal generation elements, an averaging element, a potential difference generation element, and a summation element. The current drive elements apply current to each of (n−1) of the phase windings in response to an external command signal. The signal generation elements generate phase voltage signals indicative of voltage levels at each of the (n) phase windings. The averaging element couples to the signal generation elements, and determines an arithmetic mean between a greatest one of the phase voltage signals and a least one of the phase voltage signals. The averaging element also generates an averaging signal indicative of the arithmetic mean. The potential difference generation element generates a potential difference signal indicative of the potential difference between the terminals of the dc voltage source. The summation element couples to the averaging element and to the potential difference generation element, and subtracts the averaging signal from a predetermined portion of the potential difference signal. The summation element also generates a signal indicative of that subtraction, and couples that signal to the voltage drive element. The voltage drive element, in response to the signal from the summation element, applies a voltage to that one of the phase windings not having a current applied to it.

In a further embodiment, the invention provides an alternate apparatus for controlling the speed of an n-phase electrical motor having a plural number (n) of phase windings. According to this embodiment, the apparatus includes (n−1) current drive networks and a voltage drive network.

The (n−1) current drive networks each include a summation network, a current amplifier element, and a current sensing element. The summation network receives a sinusoidal current command via a first input and a feedback signal via a second input, and generates an error signal representative of the difference between the current command and the feedback signal. The current amplifier element couples to the summation network, and applies a current signal to a phase winding in response to the error signal. The current sensing element senses the current in the phase winding that is coupled to the current amplifier element, and couples a signal representative of that current back to the summation network via the second input.

The voltage drive network provides a voltage signal to that one of the phase windings not having a current applied to it. The voltage drive network includes a coupling element, an averaging element, and a voltage amplifier element. The coupling element couples the error signal from each of the current drive networks to the voltage drive element. The averaging element determines an arithmetic mean between a greatest one of the error signals and a least one of the error signals. The averaging element also generates an averaging signal representative of the arithmetic mean, and couples that signal to the voltage amplifier element. In response to the averaging signal, the voltage amplifier element applies a voltage to the one of the phase windings not having a current applied to it.

BRIEF DESCRIPTION OF THE DRAWINGS

The foregoing and other objects of this invention, the various features thereof, as well as the invention itself, may be more fully understood from the following descriptions, when read together with the accompanying drawings in which.

DESCRIPTION OF THE PREFERRED EMBODIMENT

Figure 1:
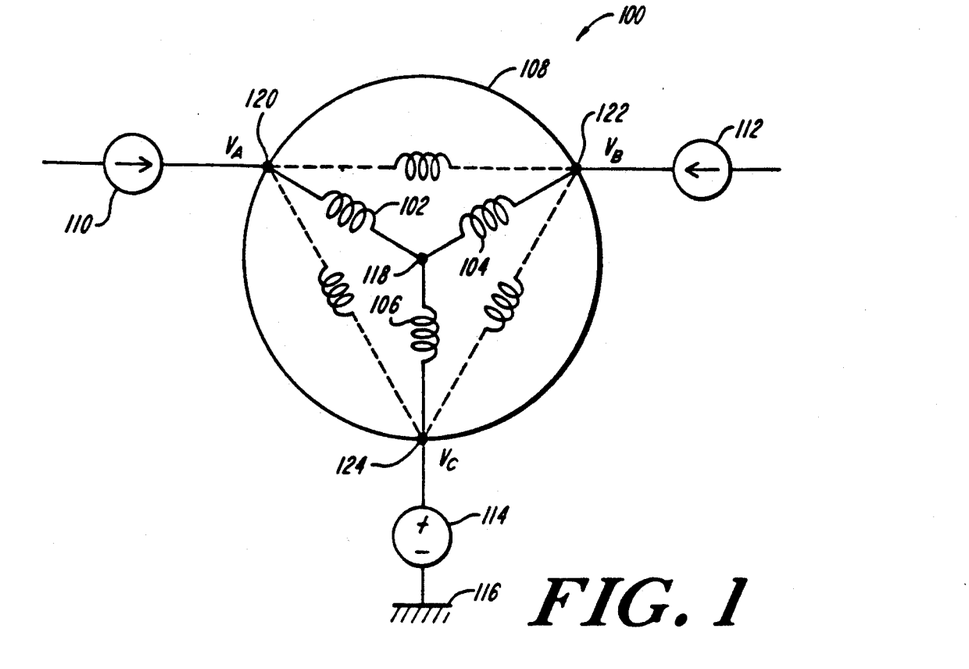
FIG. 1 is a diagram of system for driving a motor and utilizing a voltage source according to the invention.

FIG. 1 shows a system 100 for exciting the three phase windings 102, 104 and 106 of a brushless dc motor 108. The system 100 includes current sources 110 and 112 for driving the respective windings 102 and 104. A voltage source 114, including a dynamic range enhancement network according to the invention, is coupled between winding 106 and ground potential 116. As is well known, the phase windings of induction (asynchronous) and brushless dc (synchronous) motors are typically connected in either a wye or a delta configuration. For illustrative purposes, a voltage source 114, according to the invention, is depicted as driving a brushless dc motor having phase windings 102-106 connected in a standard wye configuration. However, as shown in phantom in FIG. 1, the invention is equally applicable to both synchronous and asynchronous motors connected in either a wye or delta configuration, in addition to other potential configurations.

As depicted in FIG. 1, the inner ends of the phase windings 102-106 are connected at the motor center terminal 118. The voltage at terminal 118 is not usually coupled out of the motor 108. However, it is referred to here for illustrative purposes. The outer ends of the windings 102-106 are each connected to the motor terminals 120-124, respectively. Sinusoidal current sources 110 and 112 excite the two motor phase windings 102 and 104, respectively. The current sources 110 and 112 couple to the phase windings by way of the motor terminals 120 and 122. As described in more detail below, the current sources, 110 and 112 are controlled, among other ways, through feeding back current sensed in the phase windings 102 and 104. According to Kirchoff's Current Law, the current flowing through the winding 106 is automatically determined by the currents flowing through windings 102 and 104. Consequently, according to the invention, winding 106 is driven with a voltage source 114, which is controlled predominantly through voltage feedback. The voltage source 114 couples to the phase winding 106 by way of the motor terminal 124. With terminals 120 and 122 driven by current sources, back EMF predominantly determines the terminal-to-terminal voltages (e.g., the voltage measured at each terminal 120-124 with respect to each other) of the motor. Thus, the voltage source 114 determines the instantaneous dc offset at all three terminals with respect to the motor ground reference 116. The voltage source 114 also sets the voltage at the center terminal 118 with respect to ground reference 116.

Figure 2:
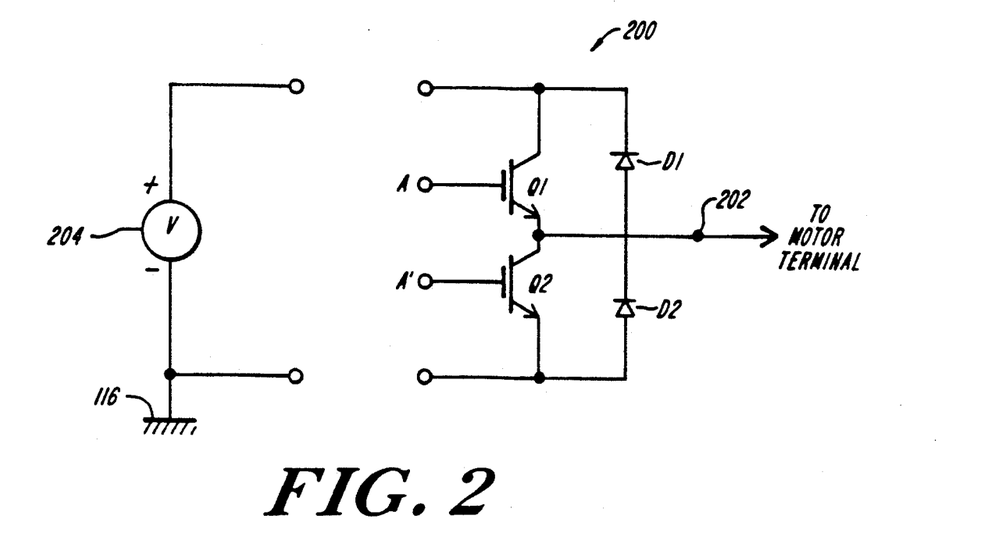
FIG. 2 is a schematic representation of the high power portion of the voltage and current sources of the type depicted in FIG. 1.

FIG. 2 shows a simplified schematic diagram of a typical high power network 200 of the type employed in the current sources 110 and 112, and in the voltage source 114; all of which are depicted in FIG. 1. When alternately powered, the two power transistors Q1 and Q2 connect the output terminal 202 to either the input power source 204 or to a common ground 116. The complementary drive signals for this network A and A' typically alternate at a frequency much faster than the frequency of the output signal at terminal 202, coupled to a motor terminal 120-124. The duty cycle of the drive signals A and A' can be varied in such a manner as to vary the average voltage or the average current of the signal coupled to the output terminal 202.

By way of example, it is well known that the phase windings 102-106 of FIG. 1 can be approximated as predominantly inductive loads. Consequently, if network 200 is coupled to one of those phase windings and is operating as a current source, when Q1 is on and Q2 is off, the current coupled from terminal 202 to the phase winding ramps in one direction. When Q1 is off and Q2 is on, the phase winding current ramps in the opposite direction. Therefore, if the signals A and A' alternately modulate Q1 and Q2 on and off with Q1 being on for fifty percent of the time and Q2 being on for fifty percent of the time (referred to as a relative on-time duty cycle of fifty percent), the network 200 provides no net dc current flow through the winding. Alternately, if the signals A and A' vary the relative on-time duty cycle for Q1 and Q2, the network 200 produces a net dc current flow. By sinusoidally varying the relative on time duty cycle of Q1 and Q2, the signals A and A' can cause the network 200 to approximate an ac current source. Alternately, those skilled in the art will appreciate that by including voltage feedback, the network 200 can also be made to approximate an ac voltage source.

Figure 3:
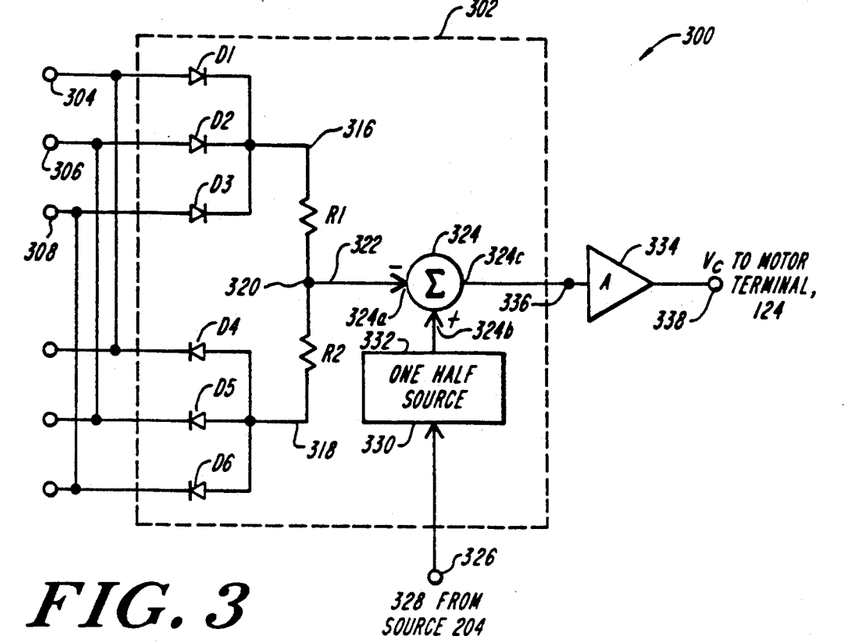
FIG. 3 is a schematic diagram of a voltage source including a dynamic range optimization network according to the invention.

FIG. 3 shows a circuit diagram of a voltage source 300, including a dynamic range optimization network 302 according to one embodiment of the invention. The network 302 varies the voltage that the voltage source 300 applies to motor terminal 124 and thus, wye-center 118, to maximize the dynamic range available to the back EMF voltages induced by the motor at terminals 120-124. According to one embodiment of the invention, the terminal-to-ground voltages $V_A$, $V_B$ and $V_C$ couple to the network 302 from motor terminals 120-124 by way of terminals 304-308. The diodes D1-D3 couple the most positive one of the voltages $V_A$, $V_B$ and $V_C$ to the resistor R1 at the point 316. Likewise, the diodes D4-D6 couple the most negative one of the voltages $V_A$, $V_B$ and $V_C$ to resistor R2 at the point 318. With the same values selected for R1 and R2, those resistors couple the average of the two voltages coupled to points 316 and 318 to the point 320. Conductor 332 in turn couples this average to the inverting input 324a of the summation element 324. The diodes D1-D6 and the resistors R1 and R2 are conventional components which can be easily specified by anyone skilled in the art.

A signal 328, indicative of the voltage available from the dc source 204, couples to the network 302 by way of terminal 326. In response to signal 328, the network 330 generates a signal 332 indicative of a portion of the dc source voltage, and couples that signal 332 into the summation element 324 via the noninverting input 324b. In the illustrated embodiment, this portion is one half the source voltage. The summation element 324 produces, at its output 324c, a signal indicative of the difference between the average of the most positive and most negative terminal voltages and one half the source voltage. The summation element 324 couples this signal to the amplification network 334 by way of the terminal 336 This network includes, as its output stage a high power network, such as network 200 shown in FIG. 2. The high power output stage is arranged to provide a controlled output voltage $V_C$. The amplification network 334 couples the voltage $V_C$ to the motor terminal 124 by way of the terminal 338.

As can be seen from FIG. 3, the dynamic range optimization network 302 modulates the drive voltage $V_C$ to the motor terminal 124 in response to detected variations in the motor terminal voltages $V_A$-$V_C$ and in response to changes in the voltage available from the dc source 204. Thus, network 300 constantly adjusts the voltage at the motor terminal 124 so that the average of the highest and lowest of the three terminal-to-ground voltages $V_A$, $V_B$, and $V_C$ will be equal to one half the source voltage 204. This allows the motor to obtain the highest back EMF levels, and thereby the highest speed and power output possible, before the output amplifiers 334 of the sources 110, 112, and 114 in FIG. 1 saturate.

Figure 4:
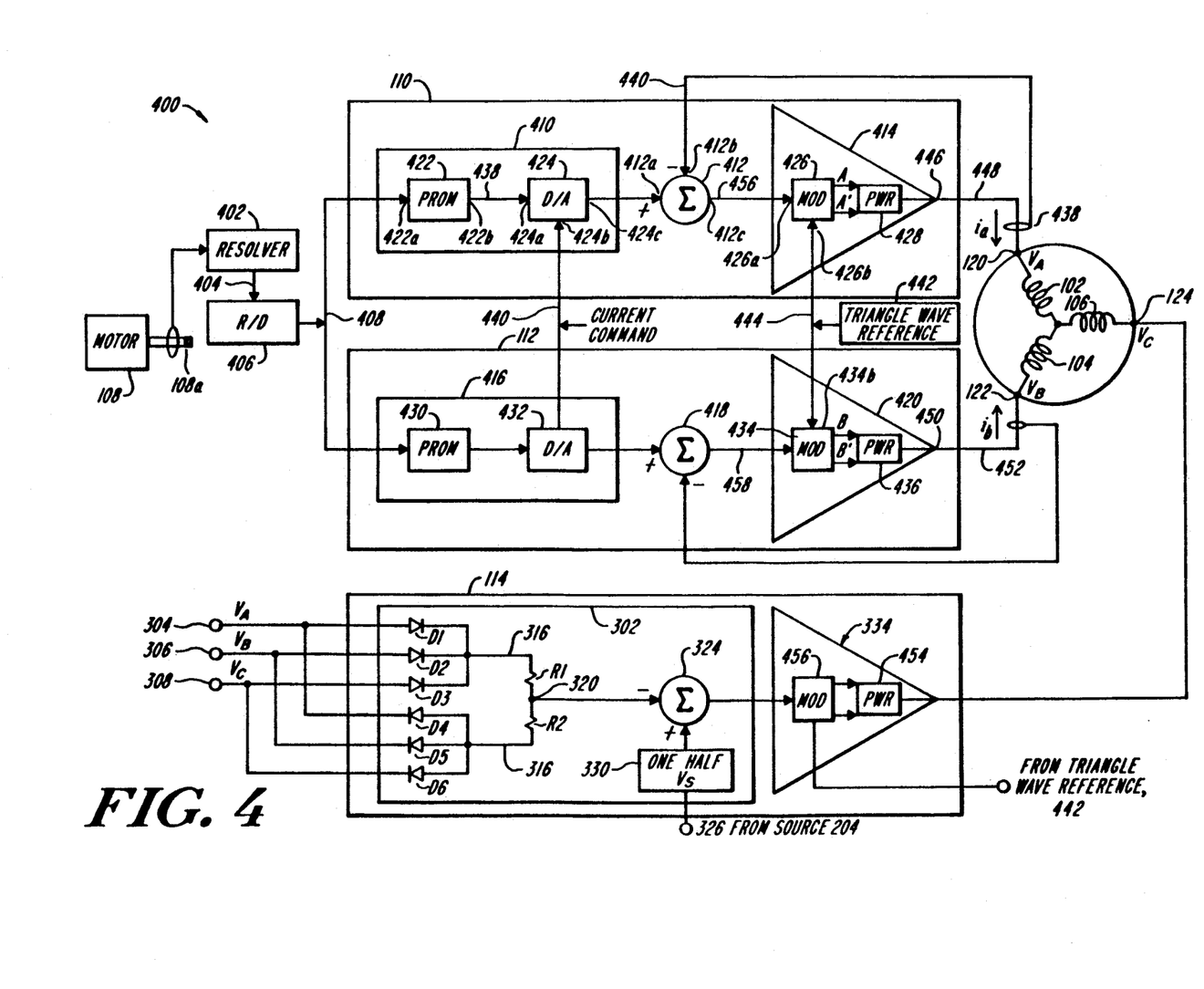
FIG. 4 is a schematic block diagram of a motor controller utilizing the dynamic range optimization network of FIG. 3.

FIG. 4 is a block diagram of a system 400 for exciting the windings 102-106 of a motor 108. The system 400 includes current sources 110 and 112 and a voltage source 114. The voltage source 114 incorporates the dynamic range extension network 302, also shown in FIG. 3.

The current sources 110 and 112 share a common resolver 402 for sensing the angular position of motor shaft 108a, and for generating the electrical signals, indicative of the sensed position. The resolver 402 couples these signals via conductor 404 to a resolver to digital converter 406. The converter 406 converts the analog signals, received over conductor 404 to a digital representation and applies the digitally encoded shaft position information to the sources 110 and 112 via conductors 408.

The current sources 110 and 112 are essentially identical. The current source 110 includes a current command processing network 410, a summation element 412 and an amplifier network 414. Similarly, the current source 112 includes a current command processing network 416, a summation element 418, and an amplifier network 420.

The current command processing network 410 includes a programmable read only memory (PROM) element 422 and a multiplying digital to analog (D/A) converter element 424. The amplifier 414 includes a pulse width modulation network 426 and a power network 428. Likewise, the current command processing network 416 includes PROM 430 and digital to analog converter element 432, and the amplifier 420 includes a modulation network 434 and a power network 436.

As shown for the network 110, the resolver to digital converter 406 couples the shaft position signal to the address inputs 422a of the PROM 422 by way of the conductors 408. The PROM 422 is programmed with digitized sine information appropriately phased for driving the motor winding 102. The PROM 422 couples its digital outputs, indicative of the sine information, to the input 424a of the multiplying D/A converter 424, by way of output 422b and conductor 438.

An externally generated control signal, indicative of a commanded motor current (or torque), couples to the multiplying input 424b of the D/A converter 424 by way of conductor 440. In response to the signals applied to the inputs 424a and 424b, the D/A converter 424 generates at its output 424c, a variable amplitude sinewave. The D/A converter 424 couples that signal to the noninverting input 412a of the summation element 412. The current sensor 438 detects the actual current ($i_a$) flowing through the phase winding 104, generates a signal indicative of that current and feeds it back, via conductor 440, to the inverting input 412b of the summation element 412. The summation element 412 generates an error signal, at its output 412c, corresponding to the difference between the commanded current, represented by the signal applied to the noninverting input 412a, and the actual current, represented by the signal applied to the inverting input 412b. The summation element 412 couples this error signal to amplifier 414, via conductor 456 and the input 426a of the pulse width modulation network 426.

The pulse width modulation network 426 generates the digital signals (A) and (A') that control the transistors Q1 and Q2 of network 200 (as shown in FIG. 2). A triangle wave reference 436, generates an isosceles triangle shaped reference signal and couples that signal, via conductor 444, to the modulator networks 426 and 434 at inputs 426b and 428b, respectively. The modulator network 426 compares the error signal on conductor 446 with the triangle reference signal on conductor 444 and produces the digital signal (A). The state of (A) (i.e., whether (A) is logical 1 (on) state or a logical 0 (off) state) depends on whether the error signal is greater or less than the triangle reference signal. Since the triangle signal is constant, the duty cycle of the signal (A) varies as a function of the magnitude of the error signal. In this way, network 426 modulates the error signal onto the triangle reference signal. The modulator network 426 also inverts the signal (A) to produce (A'), and couples the signals (A) and (A') to the high power network 428. The power network 428, in response to the signals (A) and (A'), applies the current $i_a$ to the phase winding 102, via output terminal 446, conductor 448, and motor terminal 120.

Similarly, in response to an error signal received on conductor 458, the modulation network 434 couples the signals (B) and (B') to the power network 436. In response to the signals B and B', the power network 436 applies current $i_b$ to the phase winding 104, via output terminal 450, conductor 452, and motor terminal 122.

The system 400 includes a voltage source 114 that incorporates a dynamic range enhancement network 302 according to the invention and an amplifier 334. The amplifier 334, as with amplifiers 414 and 420, includes a power network 454 and a modulator network 456. As shown in FIG. 3, the network 302 employs voltage feedback to control the output voltage $V_C$. The voltage source 114 utilizes four voltage signals $V_S$, $V_A$, $V_B$, and $V_C$. The dc source 204 couples the voltage signal $V_S$ into the voltage source 114 via the input terminal 326. The motor terminal 120 couples the voltage $V_A$ to the voltage source 114 by way of the input terminal 304. Similarly, the motor terminal 122 couples the voltage $V_B$ into the voltage source 114 by way of the input terminal 306, and the motor terminal 124 couples the voltage $V_C$ into the voltage source 114 by way of the input terminal 308.

As previously mentioned, a considerable tradeoff with respect to using a sinewave drive type motor controller is that at the highest motor speed possible it transfers less power and ac voltage to the motor than does a square wave drive controller utilizing the same dc voltage source 204. To minimize the effects of that power loss, the motor controller system 400 uses the voltage available from the dc source 204 as efficiently as possible. One way the system 400 accomplishes this is by ensuring that the back EMF voltages induced at each motor terminal 120-124 utilize the greatest available dynamic range, within the limitations of the voltage level available from dc voltage source 204. This enables the motor to rotate faster.

The magnitude of the sinusoidal terminal-to-terminal voltages between terminals 120-124 are determined predominantly by the back EMF generated by the motor. Those voltages increase with motor speed. The voltages existing between terminals 120-124 and ground are defined by both the internal back EMF sources and the external voltage impressed between terminal 124 and ground by voltage source 114. Because of the limitations set by the DC voltage source 204, both the current sources 110 and 112 and the voltage source 114 have dynamic boundaries at the points where the terminal-to-ground voltages exceed the maximum voltage level available from the dc voltage source 204 and also where the terminal-to-ground voltages become zero.

The voltage source 114, coupled to the phase winding 106 at terminal 124, determines the dc offset voltage at the wye-center point 118, measured with respect to motor ground reference 116. By modulating the voltage at terminal 124 and hence, the wye-center voltage, the system 400 can change where the terminal-to-ground voltages $V_A$, $V_B$, and $V_C$ are positioned with respect to the dynamic range boundaries fixed by the amplifiers 414, 420, and 334 and the voltage source 204. A dynamic range enhancement network 302 according to the invention modulates the voltage $V_C$ to increase the dynamic range available to the current sources 110 and 112 and to the voltage source 114. As a result, the motor can run at a higher speed, and additional power can be delivered to the motor. This concept is best illustrated by two simulations presented below.

Figure 5:
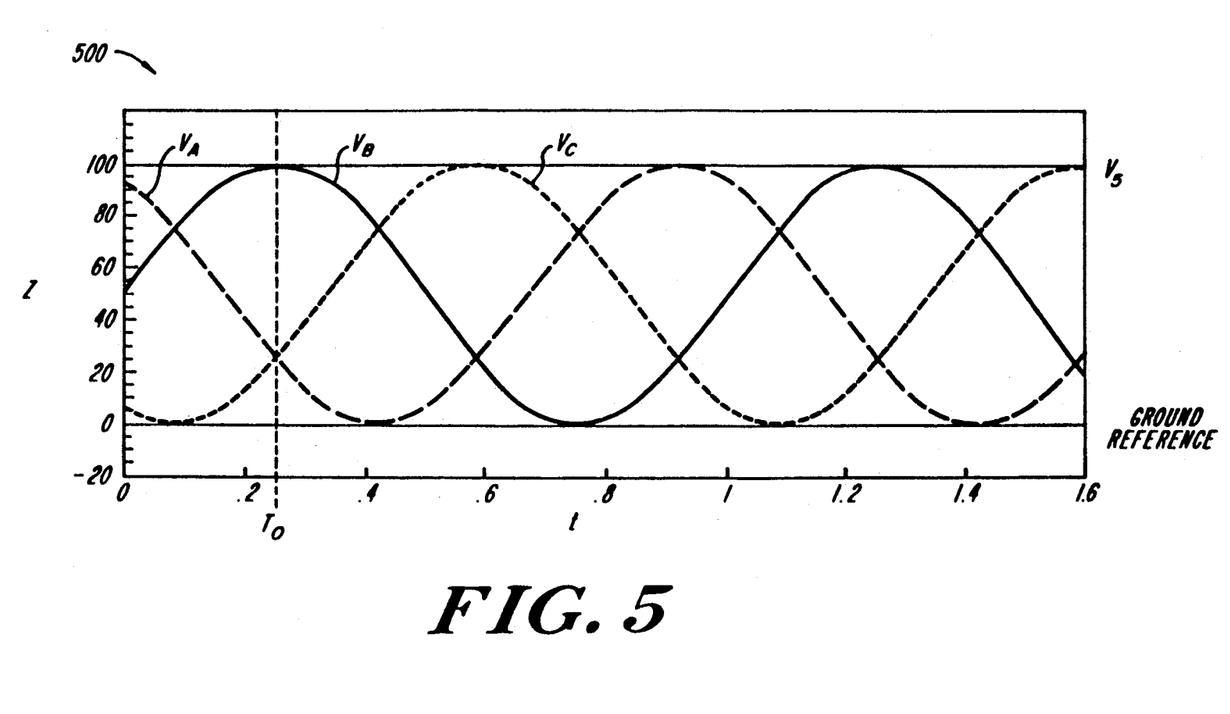
FIG. 5 depicts the simulated motor terminal voltages when the wye-center is fixed at one half the 100 Vdc source voltage.

FIG. 5 is a graphical illustration 500 of simulated terminal-to-ground voltages $V_A$, $V_B$, and $V_C$, resulting from driving the motor without the benefit of the dynamic range enhancement network of the present invention. In this simulation, the dc source voltage 204 is 100 Vdc. The voltage from the voltage source 114 is modulated to hold the voltage at the wye-center node 118, with respect to the ground reference 116, at one half the source voltage $V_S$. The motor speed is set to the maximum value possible without causing the terminal-to-ground voltages $V_A$, $V_B$, and $V_C$, to exceed the dc source voltage $V_S$ or to become negative. As a result of the wye-center voltage being set to 50 Vdc, each of the voltages $V_A$, $V_B$, and $V_C$ shown in FIG. 5, traverse symmetrically between 0 Vdc and 100 Vdc is shown along the y-axis. If the drive currents $i_a$ and $i_b$ were increased any further to cause the motor to speed up, the back EMF voltages would increase, causing the voltage waveforms $V_A$, $V_B$, and $V_C$ to clip where they approach 100 Vdc and 0 Vdc. Consequently, the motor would begin to exhibit noise characteristics similar to those observed in square wave controllers.

As can be seen from FIG. 5, the waveforms $V_A$, $V_B$ and $V_C$ do not simultaneously reach the 0 Vdc and 100 Vdc levels. For example, at $T_o$ the waveform $V_B$ is approaching 100 Vdc and the waveforms $V_A$ and $V_C$ are at 25 Vdc. Consequently, the dynamic range available to the power amplifiers 414 and 420 and thus, the excitation currents $i_a$ and $i_b$ can be further improved by varying the wye-center voltage to utilize this unused 25 volts of dynamic range. By way of example, at $T_o$ the wye-center voltage with respect to the ground reference 116 could be lowered by 12.5 Vdc to 38.5 Vdc.

With the voltage at node 118 at 38.5 Vdc, the peak-to-peak voltage swing available to the back EM signals before amplifier saturation occurs is increased by 25 Vdc. This allows higher motor speeds without distortion of the driving waveform, and therefore allows for more power to be delivered to the motor. Consequently, the system 400 can increase the speed of the motor until the back EMF causes the terminal-to-ground voltages to again approach zero and 100 volts.

As can be seen from this example, the most efficient solution is not one in which the wye-center voltage remains constant. Instead, the widest dynamic range is achieved by modulating the voltage $V_C$ so that the voltage at the wye-center node 118 varies as a function of both the dc source voltage $V_S$ and the terminal-to-ground voltages $V_A$, $V_B$ and $V_C$.

Figure 6:
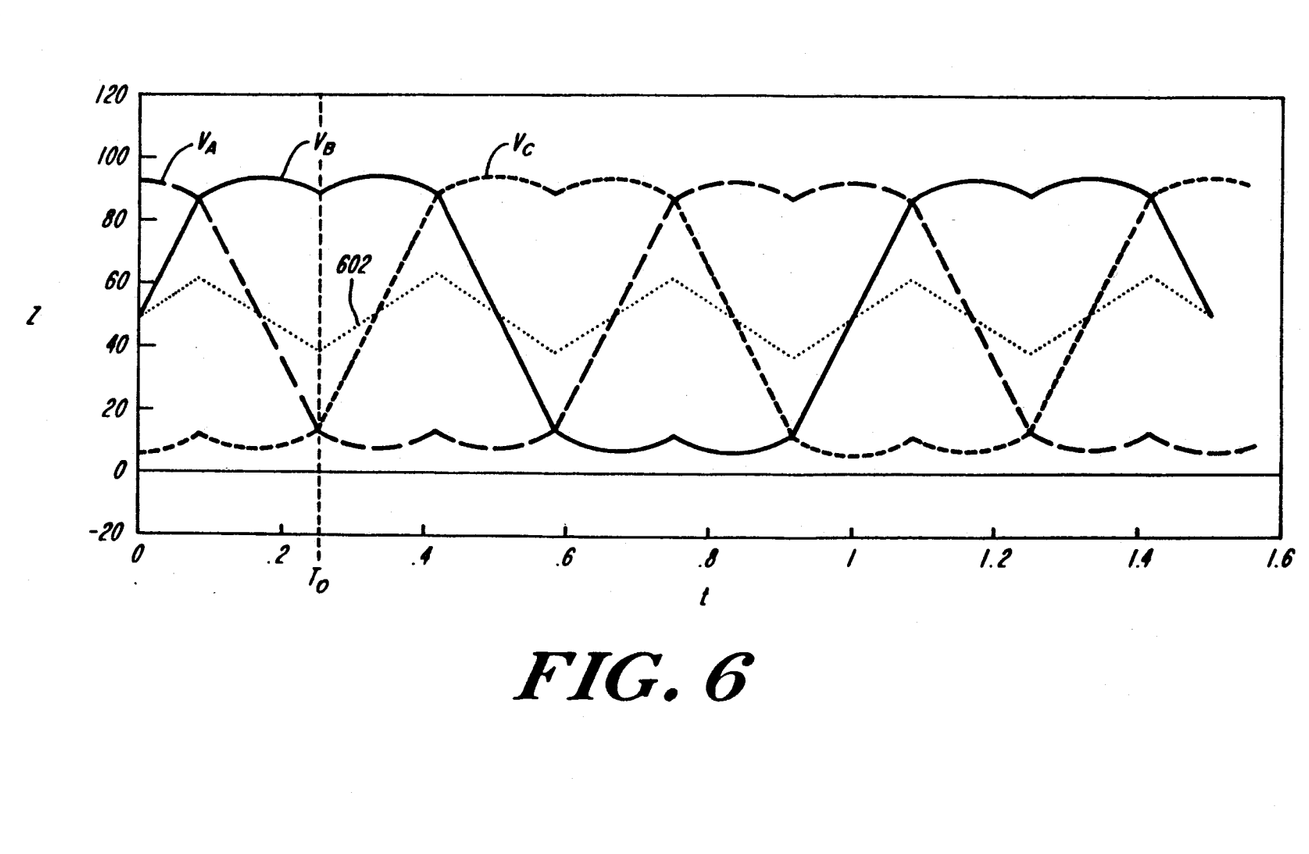
FIG. 6 depicts the simulated motor terminal voltages resulting from driving one terminal with a voltage source including the dynamic range enhancement network of FIG. 3.

FIG. 6 shows the terminal-to-ground voltages $V_A$, $V_B$ and $V_C$, resulting from varying the wye-center voltage in accord with the above described optimization. The frequency, phase and amplitude of the excitation currents are identical to those employed in the simulation of FIG. 5. The difference is that the dynamic range optimization network 302 automatically modulates the voltage from voltage source 114 to adjust the voltage at the wye-center node 118 to provide the maximum possible dynamic range for the back EMF and thus, for the excitation signals $i_a$ and $i_b$ at any particular point in time. As can be seen, the waveform peaks are pulled back from the saturation limits (e.g., 0 Vdc and 100 Vdc), thereby increasing the dynamic range available to those signals. By way of example, at $T_o$ the wye-center voltage 602 is pulled back 12.5 Vdc from its nominal value of 50 Vdc to 38.5 V. This allows the motor speed, and the back EMF voltages to be increased beyond what is possible in the system illustrated in FIG. 5. One consequence is that the driving currents $i_a$ and $i_b$ can now be increased to utilize this additional 12.5 volts of dynamic range. This allows additional power to be transferred to the motor without causing $V_A$, $V_B$, and $V_C$ to exceed the voltage available from the dc source 204, and without causing the drive currents to depart from their preferred sinusoidal wave shape.

It should be noted that while the terminal-to-ground voltages $V_A$, $V_B$, and $V_C$ in FIG. 6 appear to be distorted, the terminal-to-terminal voltages nevertheless remain sinusoidal.

FIGS. 5 and 6 show the practical advantages of properly manipulating the voltage at terminal 124 to alter the voltage at the wye-center node 118. The network 302 determines this voltage in real time, and applies it to terminal 124 by way of a closed loop control system. The object of the control system is to insure that the highest and the lowest terminal voltages are symmetrically placed with respect to a portion of the voltage available from the dc source 204 (one half the source voltage in the illustrated embodiment).

It should be noted that a closed loop control system is not the only means of achieving the desired voltage wave form at terminal 124. The required voltage at terminal 124 is a predictable function of motor speed and shaft position, just as the motor back EMF voltages are also a predictable function of motor speed and shaft position. In some applications it may be desirable to create the required correction voltage based on those known quantities rather than the measured terminal voltages 120, 122, and 124.

Figure 7:
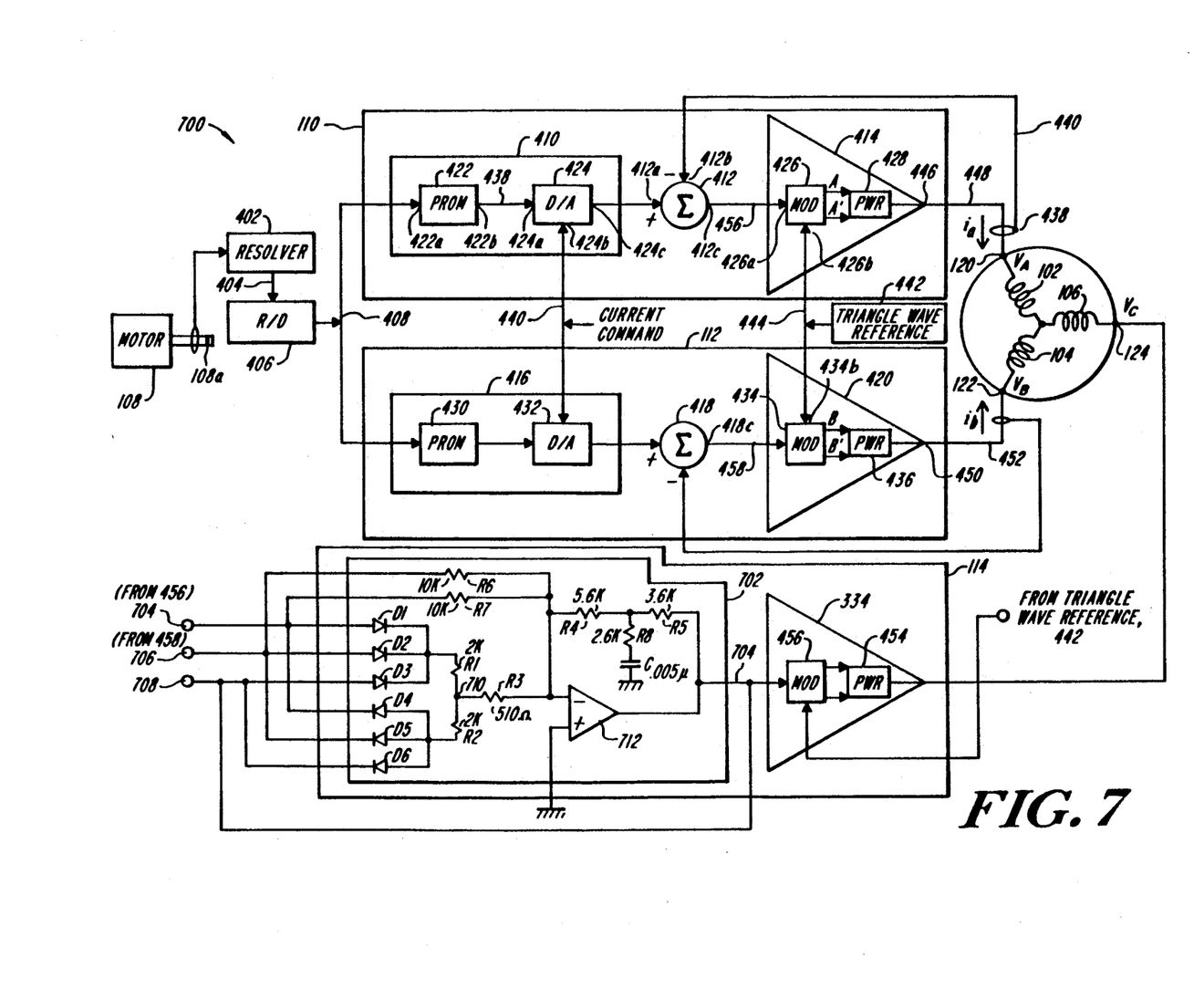
FIG. 7 is a block diagram of the motor controller of FIG. 4 but employing an alternate embodiment of a dynamic range enhancement network according to the invention.

FIG. 7 is a block diagram of the motor controller of FIG. 4, but employing an alternate embodiment 702 of the dynamic range enhancement network 302.

In this embodiment, rather than utilizing the terminal voltages $V_A$, $V_B$, and $V_C$, along with the source voltage $V_S$ to control $V_C$, the network 702 uses the low level signals from conductors 456, 458, and 704. Thus, the error signal from summation element 412 couples from output terminal 412c to terminal 504 of the network 702. Similarly, the error signal on conductor 458 couples from output terminal 418c to terminal 706, and the low level signal on conductor 704 couples to terminal 708.

The network 702 achieves the same purpose, but provides several practical advantages over network 302. As one skilled in the art of circuit design will appreciate, one advantage is that, by avoiding direct use of the voltages $V_A$, $V_B$, and $V_C$, network 702 reduces noise coupling and simplifies signal grounding requirements. Additionally, by taking advantage of the circuit configuration typically used at PWM modulator 456, it is possible to eliminate the physical need for elements 324 and 330 shown in FIG. 4. The function provided by elements 324 and 330 in FIG. 4 is still taking place, but it occurs automatically inside PWM modulator 456. This modulator is configured so that zero input signal will produce a 50% output duty cycle which will automatically place the output voltage of power amplifier 454 at 50% of the DC level of power source 204. Thus in the realization of the invention as described in FIG. 7, the separate physical existence of the components 324 and 330, which are shown in the logical description of FIG. 4, is no longer necessary.

The embodiment diagrammed in FIG. 7 contains several other practical improvements which will be recognized by anyone skilled in the art. The network 302 shown in FIG. 3 synthesizes the desired output signal at terminal 336 entirely by way of feedback through the diodes D1-D6. It's clear from the simulation of FIG. 6 that the desired output signal at terminal 336 consists primarily of an appropriately phased sinewave to which has been added waveform 602, a relatively small corrective signal. In the network 702 of FIG. 7 the basic sinewave is created by summing together the voltages 456 and 458 with resistors R6 and R7. The corrective signal 602 used to maximize dynamic range is then created by the diodes D1-D6 and resistors R1-R2. This signal is summed with the sinewave by resistor R3, and the combined signal is amplified by amplifier 712. The use of resistors R6 and R7 makes the entire implementation easier to achieve since there is less dependence on high feedback gain to produce the desired output signal.

Feedback is still used in the embodiment of FIG. 7 to create the desired driving voltage at motor terminal 124. It will be appreciated by anyone skilled in the art that as with any feedback system this one must be carefully compensated to achieve the desired result without undesired oscillation or distortion. The compensation network consisting of R4, R5, R8, and C is used for this purpose. The values chosen for these components depend on the gains and bandwidths chosen for the feedback loops used in current sources 110 and 112 as well as the combined gain of PWM modulator 456 and power amplifier 454.

As in the controller 400 of FIG. 4, the enhancement network 702 produces a low level voltage command signal on conductor 704. The amplifier 334, in response to the command signal on conductor 704 applies a voltage to the phase winding 106, by way of motor terminal 124.

Figure 8A:
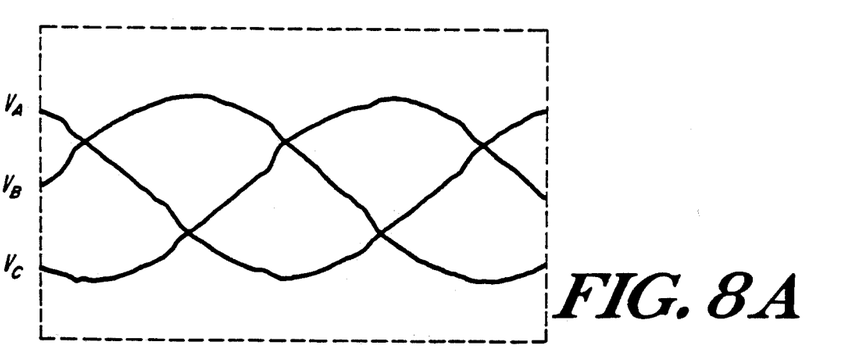
FIGS. 8A and 8B depict actual motor terminal voltages measured both without and then with the enhancement network of FIG. 7.

FIG. 8 depicts the drive signals for $V_A$, $V_B$, and $V_C$ as provided to the PWM amplifiers at their inputs 456, 458, and 704. Since these amplifiers represent gain only, their input waveforms are accurate representations of their output waveforms. In FIG. 8A these signals are shown without the benefit of range enhancement network 700. The vertical scaling is 5 volts per division. The motor speed was increased to 645 RPM, the point at which the signals $V_A$, $V_B$, and $V_C$ began to distort. As can be seen, each of those signals measure 18 volts peak-to-peak.

Figure 8B:
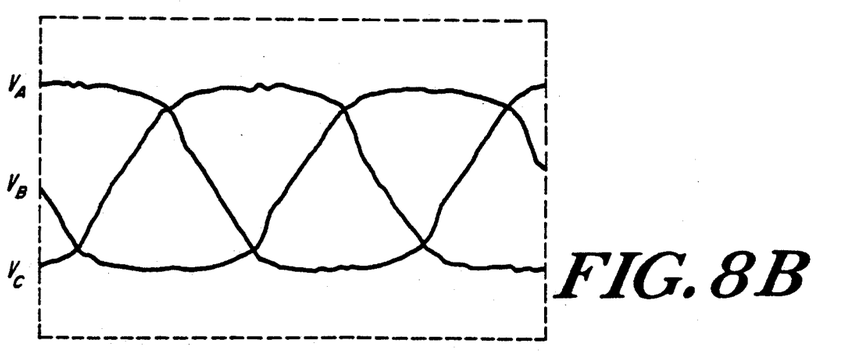

FIG. 8B shows these same signals when the dynamic range enhancement network 700 is used. As in FIG. 8A, the vertical scaling is 5 volts per division. With the network 700 operating, the motor speed reached 750 RPM before voltages $V_A$, $V_B$, and $V_C$ reached the 18 volts peak-to-peak value of FIG. 8A. This represents a measured range enhancement of 16.5%.

Figure 9A:
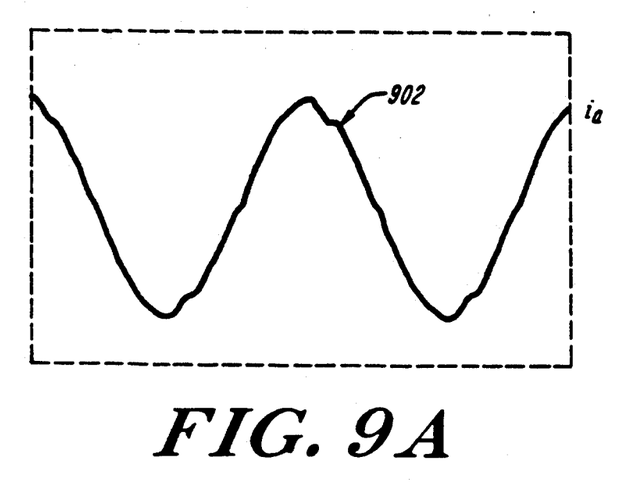
FIGS. 9A and 9B depict actual motor winding currents measured both without and then with the enhancement network of FIG. 7.
Figure 9B:
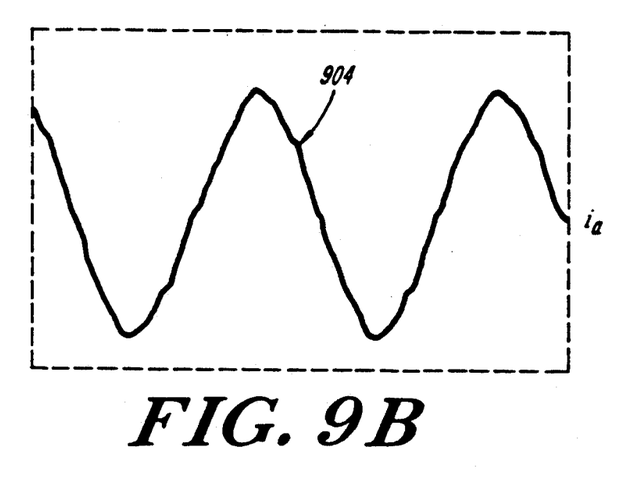

FIGS. 9A and 9B depict an alternate way of demonstrating the dynamic range enhancement provided by the network 700 of FIG. 7. The current in the motor winding 102 is monitored as the motor speed is increased FIG. 9A shows $i_a$ at a motor speed of 735 RPM. As can be seen, the signal ia begins to distort at point 902. FIG. 9B shows the signal $i_a$ for a motor speed of 847 RPM with the enhancement network 700 operating. As can be seen at 904, there is actually less distortion with an increase in speed approximately 15%.

Thus, the invention provides a system for maximizing the power which a particular dc power source can transfer to a particular motor by enhancing the dynamic range available to the motor terminal voltages.

Although the illustrative example discussed in conjunction with FIGS. 5-9 employ the wye wound motor of FIG. 1, the same principles hold for use with a delta wound motor. In that case the physical placement of the wires may be different but the electrical model of the motor can be constructed equivalent to that shown in FIG. 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for generating a control signal for application to one of a plural number (n) of phase windings of an n-phase electrical motor, wherein the other (n−1) of the phase windings are driven from current sources, and the motor is powered from a dc voltage source having a high side terminal and a reference side terminal and a potential difference between the high side terminal and the reference side terminal, the apparatus comprising:

A. signal generation means for generating (n) phase voltage signals, each phase voltage signal being indicative of the voltage level at a corresponding one of the (n) phase windings;

B. averaging circuit means, coupled to the signal generation means, for generating an averaging signal representative of an arithmetic mean between a greatest one of the phase voltage signals and a least one of the phase voltage signals, thereof;

C. potential difference generation circuit means for generating a potential difference signal indicative of a predetermined portion of the potential difference; and D. summation circuit means coupled to the averaging circuit means and to the potential difference circuit means, for generating a control signal representative of the difference between the potential difference signal and the averaging signal.

2. An apparatus according to claim 1 wherein the predetermined portion is fifty percent.

3. An apparatus according to claim 1 wherein (n) is equal to 3.

4. An apparatus according to claim 3 wherein the phase windings are arranged in a wye configuration.

5. An apparatus according to claim 3 wherein the phase windings are arranged in a delta configuration.

6. An apparatus for controlling the speed of an n-phase electrical motor having a plural number (n) of phase windings, wherein the motor is powered from a dc voltage source having a high side terminal and a reference side terminal and a potential difference between the high side terminal and the reference side terminal, the apparatus comprising:

A. current drive means for applying current signal to each of (n−1) of the phase windings in response to an external command signal;

B. signal generation means for generating (n) phase voltage signals, each phase voltage signal being indicative of the voltage level at a corresponding one of the (n) phase windings;

C. averaging means, coupled to the signal generation means, for generating an averaging signal representative of an arithmetic mean of a greatest one of the phase voltage signals and a least one of the phase voltage signals;

D. potential difference generation means for generating a potential difference signal indicative of a predetermined portion of the potential difference;

E. summation means, coupled to the averaging means and to the potential difference generation means, for generating a control signal indicative of the difference between the potential difference signal and the averaging signal; and F. voltage drive means, coupled to the summation means and responsive to the control signal, for applying a drive voltage to that one of the phase windings not having a current applied thereto, wherein the drive voltage is related to the difference between the potential difference signal and the averaging signal.

7. An apparatus according to claim 6 wherein the applied voltage is linearly related to the difference between the potential difference signal and the averaging signal.

8. An apparatus according to claim 6 wherein the predetermined portion is fifty percent.

9. An apparatus according to claim 6 wherein (n) is equal to 3.

10. An apparatus according to claim 9 wherein the phase windings are arranged in a wye configuration.

11. An apparatus according to claim 10 wherein the phase windings are arranged in a delta configuration.

12. An apparatus for controlling the speed of an n-phase electrical motor having a plural number (n) of phase windings, wherein the motor is powered from a dc voltage source, the apparatus comprising:

A. (n−1) current drive networks, each including,
  i. a summation network with first input means for receiving a sinusoidal current command, a second input means for receiving a feedback signal, and an output means for generating a current error signal representative of the difference between the current command and the feedback signal,
  ii. a current amplifier, having an input connected to the output means of the summation network, and having an output terminal adapted for connection to an associated one of the phase windings, and including means for applying a current signal to the associated one of the phase windings, wherein the current signal is related to the current error signal, and
  iii. a current sensor, including means for generating an output signal indicative of a current in the associated one of the phase windings, and means for coupling that output signal to the second input of the summation network;

B. a voltage drive network for providing a voltage signal to that one of the phase windings not having a current applied thereto, the network including,
  i. an averaging network including averaging means for generating at a voltage drive output terminal an averaging signal indicative of an arithmetic mean of a greatest one and a least one of a plurality of input signals, each of the input signals being representative of a different one of the current error signals and the averaging signal, and
  ii. a voltage amplifier having an input connected to the voltage drive output terminal and an output terminal adapted for connection to the one of the phase windings not having a current signal applied thereto, and including means for applying a drive voltage to the one of the phase windings in response to the averaging signal, wherein the applied drive voltage is related to the averaging signal.

13. An apparatus according to claim 12 wherein the applied voltage is linearly related to the difference between the potential difference signal and the averaging signal.

14. An apparatus according to claim 12 wherein the current signal is linearly related to the difference between the current command and the feedback signal.

* * * * *